US00RE42061E

(19) United States
(12) Reissued Patent
Olsson et al.

(10) Patent Number: US RE42,061 E
(45) Date of Reissued Patent: Jan. 25, 2011

(54) SEALING DEVICE

(75) Inventors: Henrik Olsson, Katrineholm (SE); Jörgen Stendahl, Vingåker (SE)

(73) Assignee: SKF Mekan AB, Katrineholm (SE)

(21) Appl. No.: 11/785,570
(22) Filed: Apr. 18, 2007

Related U.S. Patent Documents

Reissue of:
(64) Patent No.: 6,880,830
Issued: Apr. 19, 2005
Appl. No.: 10/235,637
Filed: Sep. 6, 2002

(30) Foreign Application Priority Data

Sep. 7, 2001 (SE) ..... 0102976-8

(51) Int. Cl.
*F16J 15/32* (2006.01)

(52) U.S. Cl. ..... 277/551; 277/562; 277/563; 277/565; 277/573; 277/566; 277/536

(58) Field of Classification Search ..... 277/551, 277/562, 563, 566, 573, 574
See application file for complete search history.

(56) References Cited

U.S. PATENT DOCUMENTS

| | | | | | |
|---|---|---|---|---|---|
| 2,088,703 | A | * | 8/1937 | Hubbard et al. | 277/555 |
| 2,167,603 | A | * | 7/1939 | Victor | 277/562 |
| 2,177,441 | A | | 10/1939 | Pesarese | |
| 2,251,701 | A | * | 8/1941 | Dixon | 173/213 |
| 2,461,655 | A | | 2/1949 | Noble | |
| 2,888,281 | A | | 5/1959 | Ratti | |
| 2,983,529 | A | | 5/1961 | Price | |
| 3,312,149 | A | * | 4/1967 | Fleckenstein et al. | 92/170.1 |
| 3,325,175 | A | | 6/1967 | Lower | |
| 3,338,584 | A | | 8/1967 | Nakanishi et al. | |
| 3,347,556 | A | | 10/1967 | Fleckenstein et al. | |
| 3,548,721 | A | | 12/1970 | Eisennegger | |
| 3,563,557 | A | | 2/1971 | Doutt | |
| 3,575,426 | A | * | 4/1971 | Durham | 277/432 |
| 3,612,551 | A | * | 10/1971 | Grabill, Jr. | 277/566 |
| 3,621,952 | A | | 11/1971 | Long et al. | |
| 3,854,737 | A | | 12/1974 | Gilliam, Sr. | |
| 3,871,666 | A | | 3/1975 | Franz et al. | |
| 3,955,859 | A | | 5/1976 | Stella et al. | |
| 4,159,828 | A | | 7/1979 | Ostling et al. | |
| 4,165,085 | A | | 8/1979 | Person | |
| 4,421,329 | A | | 12/1983 | Jelinek | |
| 4,586,720 | A | | 5/1986 | Simmons et al. | |
| 4,650,196 | A | | 3/1987 | Bucher et al. | |
| 4,717,161 | A | * | 1/1988 | Stremeckus | 277/562 |
| 4,865,170 | A | | 9/1989 | Ciepichal | |
| 4,995,623 | A | | 2/1991 | Wada et al. | |
| 5,271,629 | A | | 12/1993 | Dahlhaus et al. | |
| 5,503,480 | A | * | 4/1996 | Caillaut et al. | 384/477 |
| 5,664,651 | A | | 9/1997 | Miura et al. | |
| 5,667,225 | A | | 9/1997 | Vollmer et al. | |
| 5,908,249 | A | | 6/1999 | Nisley et al. | |
| 6,123,338 | A | | 9/2000 | Edelmann et al. | |

FOREIGN PATENT DOCUMENTS

| | | | |
|---|---|---|---|
| DE | 2 104 141 | | 8/1872 |
| DE | 332 687 | | 10/1976 |
| DE | 39 29 065 | A1 | 3/1991 |
| DE | 198 41 123 | A1 | 4/2000 |
| EP | 0 441 741 | A1 | 8/1991 |
| JP | 62-13871 | A | 1/1987 |

* cited by examiner

*Primary Examiner*—Alison K Pickard
(74) *Attorney, Agent, or Firm*—Buchanan Ingersoll & Rooney PC

(57) ABSTRACT

A sealing device for sealing off an opening between a shaft and a grease-lubricated split bearing housing comprises two halves divided by a diametrical cut and each having a main body arranged in a circumferential groove in the bearing housing opening. The sealing device is provided with sealing lips spaced apart from each other and forming an intermediate grease reservoir, and reinforcing portions arranged between the main seal body and the sealing lips to facilitate sealing engagement between the sealing lips and a shaft when an upper bearing housing half arranged with the upper seal half is mounted onto the shaft while the shaft is resting in a lower bearing housing half arranged with the lower seal half.

21 Claims, 2 Drawing Sheets

SEALING DEVICE

Matter enclosed in heavy brackets [ ] appears in the original patent but forms no part of this reissue specification; matter printed in italics indicates the additions made by reissue.

FIELD OF THE INVENTION

This invention generally relates to a sealing device. More particularly, the invention pertains to a sealing device for sealing off an opening between a shaft and a grease-lubricated split bearing housing, wherein the sealing device generally includes a main body arranged in a circumferential groove in the bearing housing opening, with the sealing device being divided in two halves by a diametrical cut.

BACKGROUND OF THE INVENTION

For sealing off an opening between a shaft and a split bearing housing, sealing devices have been used which are in the form of sealing rings comprising a main body and a sealing lip, with the sealing rings being divided in two halves by virtue of a diametrical cut.

When such a known sealing device is mounted in a bearing housing, one seal half is positioned in a groove at an opening in the lower bearing housing half and the shaft is positioned in the opening. Afterwards, the other seal half is positioned in a groove in the upper bearing housing half and the upper bearing housing half is positioned over the lower half. Then, the two bearing housing halves are pressed against each other.

Unfortunately, problems exist with this type of sealing device in that the sealing function can be relatively easily reduced to a significant extent or virtually lost. The sealing lip which engages the shaft when the two bearing housing halves are pressed against each other is weak and has a tendency of becoming partially folded during assembly. This folding motion is quite difficult, if not virtually impossible, to visually detect as the lip is normally hidden by the bearing housing. However, it will be apparent that the lip has been folded because the sealing function of the lip is significantly reduced or lost.

For other purposes, other known types of sealing devices have ben employed. These sealing devices function in ways other than that described above, for example by being provided with a plurality of sealing lips to ensure good sealing.

U.S. Pat. No. 5,908,249 and U.S. Pat. No. 4,586,720 disclose sealing devices in the form of sealing rings provided with a plurality of sealing lips that are intended to be brought into sealing engagement against a bearing assembly. However, these sealing devices are used in specific applications. For example, the sealing device disclosed in U.S. Pat. No. 4,586,720 relates to neck seals of the type employed on the roll necks of rolls in a rolling mill. The neck seal is intended to prevent water from infiltrating into the bearing and contaminating the bearing oil while at the same time preventing loss of oil from the bearing.

SUMMARY OF THE INVENTION

According to one aspect, a sealing device which seals off an opening between a shaft and a grease-lubricated split bearing housing comprised of an upper bearing housing half and a lower bearing housing half, includes a main body arranged in a circumferential groove in the opening of the bearing housing and divided into two halves by a diametrical cut. The main body is provided with a pair of sealing lips spaced apart from each other, with an intermediate grease reservoir between the sealing lips. The main body also includes reinforcing portions arranged between the main body and the sealing lips to facilitate sealing engagement between the sealing lips and the shaft when the upper bearing housing half provided with the upper seal half is mounted onto the shaft with the shaft resting in the lower bearing housing half provided with the lower seal half.

According to another aspect, a sealing device sealing off an opening between a shaft and a lubricated bearing housing comprised of an first bearing housing half and a second bearing housing half, includes a main body divided into first and second seal halves by a diametrical cut, with the first seal half being positioned in a circumferential groove in the first bearing housing half and the second seal half being positioned in a circumferential groove in the second bearing housing half. The first and second seal halves are each provided with a pair of sealing lips spaced apart from each other and reinforcing portions each arranged between the main body and one of the sealing lips. The first and second seal halves are each provided with an intermediate lubricant reservoir located between the sealing lips.

In accordance with another aspect, a bearing assembly includes a lubricated bearing housing having a circumferential groove formed on an inner surface of the bearing housing and comprised of a first bearing housing half and a second bearing housing half, a shaft, an opening between the shaft and the lubricated bearing housing, and a sealing device for sealing off the opening between the shaft and the lubricated bearing housing. The sealing device includes a main body divided into two halves by a diametrical cut, and each arranged in the circumferential groove of the bearing housing. The sealing device is also provided with a pair of sealing lips spaced apart from each other, reinforcing portions arranged between the main body and the sealing lips, and an intermediate grease reservoir located between the sealing lips.

The sealing device is able to at least inhibit folding of the sealing lips during assembly of the split bearing housing, while also providing excellent sealing effect and ease in assembly. Additionally, the sealing device at least inhibits the sealing lips from being worn down too quickly because of pressure in the grease reservoir.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
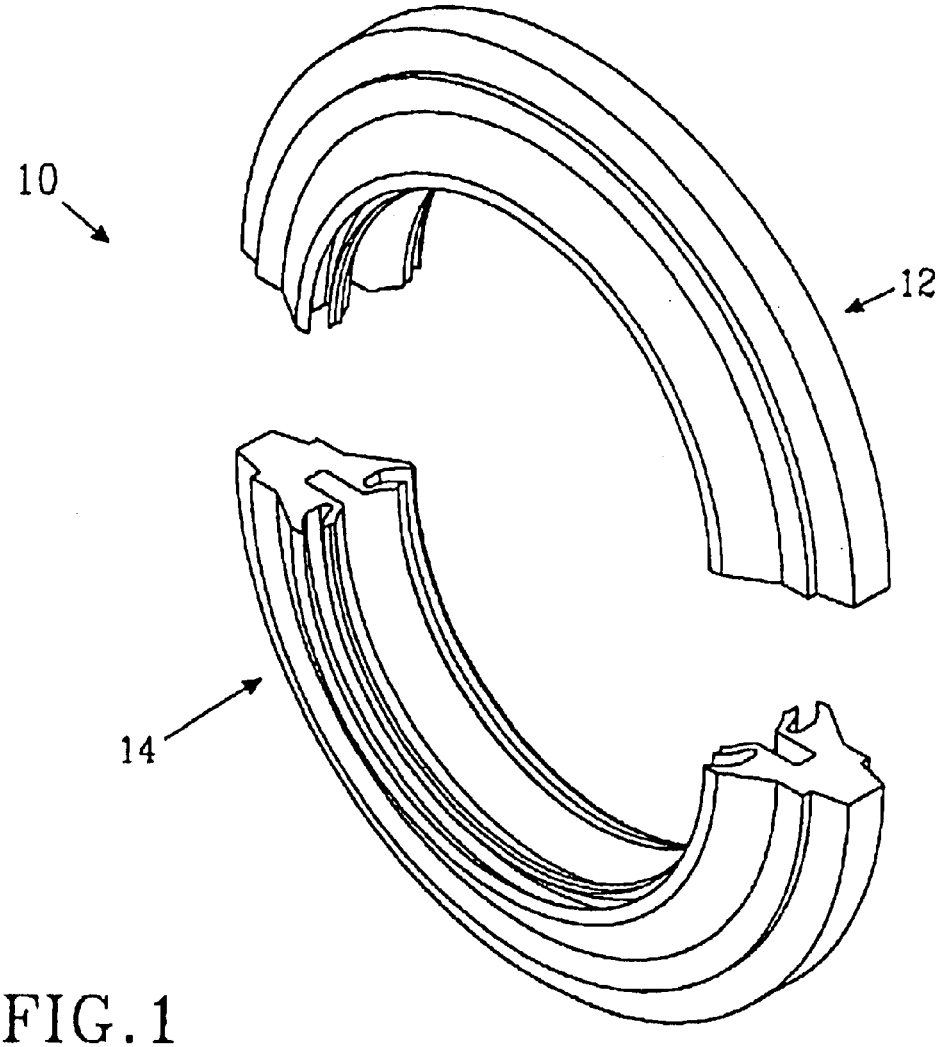
FIG. 1 is a top perspective view of the split sealing device according to an embodiment.

Referring initially to FIG. 1, the sealing device 10 is substantially annular in shape and forms a ring-shaped or annular sealing element which is split in two halves by a diametrical cut. The two halves include an upper half or first seal half 12 and a lower half or second seal half 14.

Figure 2:
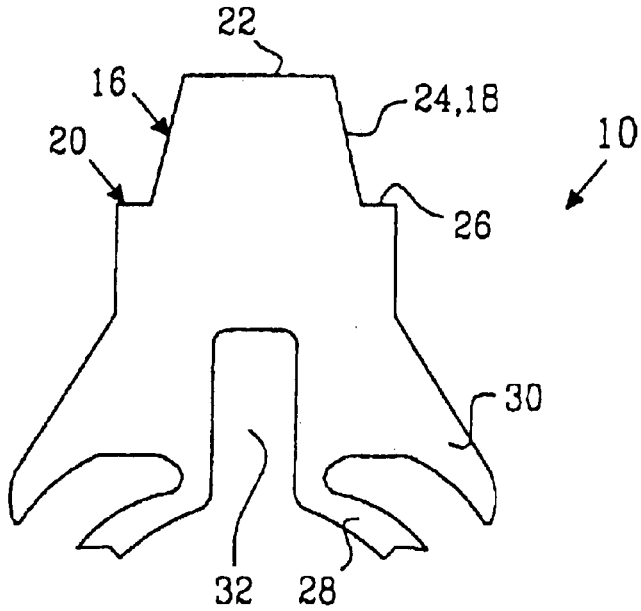
FIG. 2 is a cross-sectional view of the sealing device shown in FIG. 1.

Considering the cross-section illustrated in FIG. 2, each half of the sealing device 10 is comprised of a one-piece main body 16. This main body 16 possesses a first end (i.e., the upper end in FIG. 2) provided with a protrusion 18 and a shoulder 20 on either side of the protrusion. The protrusion 18 has a planar top surface 22 and outwardly inclined side surfaces 24 which extend down to the shoulders 20. The protrusion thus increases in dimension towards the shoulders 20. The shoulders 20 each have a planar surface 26 substantially parallel with the top surface 22 of the protrusion 18.

The second end of the main body 16 (i.e., the lower end in FIG. 2) is provided with sealing lips 28 and reinforcing portions 30. In this illustrated embodiment, the second end of the main body 16 is provided with two sealing lips 28 spaced apart from each other and forming an intermediate, generally axially extending, space 32 which serves as a reservoir for grease lubricant. The reservoir 32 is substantially rectangular and preferably centered under the protrusion 18 of the main body 16. In addition, the reservoir 32 is preferably half as wide as the protrusion 18, for example half as wide as the width of the protrusion 18 at about the axial midpoint. The sealing lips 28 are directed in generally opposite directions away from the reservoir and are outwardly conical or somewhat diagonally oriented.

Each of the two halves forming sealing device 10 also includes two reinforcing portions 30 which are spaced from the shoulders 26. These reinforcing portions 30 are arranged outside the sealing lips 28, and between the main seal body 16 and the sealing lips 28. In addition, the reinforcing portions 30 are made with a material thickness of relatively substantial thickness and have a rather stiff design capable of protecting the sealing lips from large dirt particles and sustaining most of the bending forces acting on the sealing device 10 during assembly. The sealing lips 28, on the other hand, have a substantially smaller material thickness than the reinforcing portions 30 and are therefore more easily bent.

Each half of the sealing device 10 is made in one piece by injection molding, using a material that is somewhat flexible, for example a polymeric material such as, for example, polyurethane.

Figure 4:
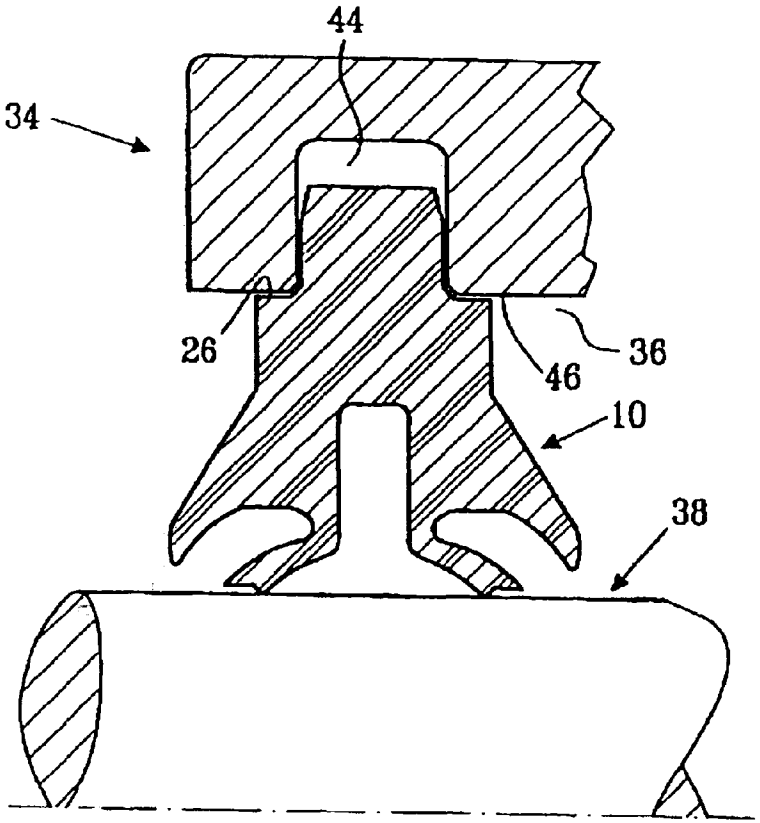
FIG. 4 is a cross-sectional view of the sealing device mounted in the bearing housing.
Figure 3:
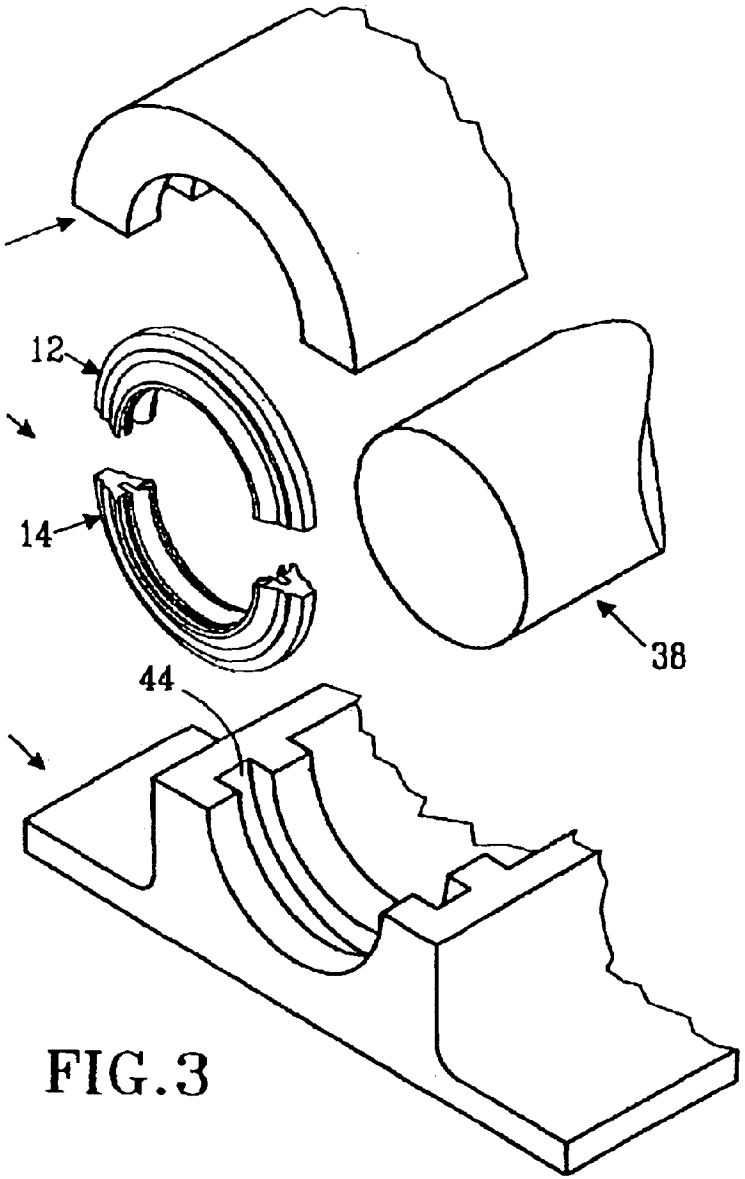
FIG. 3 is an exploded view of various parts forming a bearing assembly according to an embodiment, including the sealing device shown in FIG. 1.

FIGS. 3 and 4 illustrate how the sealing device 10 is mounted in a bearing housing 34 to produce a bearing assembly. As mentioned above, the sealing device 10 is intended to be used to seal off an opening 36 between a shaft 38 and a grease-lubricated split bearing housing 34. The bearing housing 34 comprises two halves, an upper bearing housing half 40 and a lower bearing housing half 42. The bearing housing opening 36 is arranged with a circumferential groove 44 that is adapted to receive the sealing device 10. More particularly, the circumferential groove 44 is formed in the upper and lower bearing housing halves. The groove 44 has a form or shape substantially corresponding to that of the protrusion 18, but with the groove 44 having a rectangular cross-section as seen in FIG. 4. The width of the groove 44 is a bit smaller than the width of the protrusion 18 at the thickest portion of the protrusion 18.

Upon assembly, the lower seal half 14 is positioned in the groove 44 in the lower bearing housing half 42. Because the protrusion 18 of the sealing device 10 is slightly larger than the width of the groove 44, the protrusion 18 has to be pressed into the groove 44 and is squeezed. The sealing device 10 is pressed so far into the groove 44 that the shoulders 20 are brought into contact with the bearing housing surface 46 near to or adjoining the groove 44. Similarly, the upper seal half 12 is positioned in the groove in the upper bearing housing half 40. Preferably, the reservoir 32 is then filled with grease lubricant.

A shaft 38 is positioned in the opening 36 in the lower bearing housing half 42, and the upper bearing housing half 40 is mounted onto the shaft 38 and the lower bearing housing half 42. When pressing the two bearing housing halves 40, 42 together, the sealing lips 28 are brought into sealing engagement with the shaft 38. An excellent and reliable sealing thus results by virtue of the stiff, bending resistant, reinforcing portions 30, the existence of which in the sealing device 10 at least inhibits and preferably prevents the sealing lips 28 from folding.

During use of the bearing arrangement, the bearing housing 34 needs to be filled up with new grease lubricant from time to time. However, when new grease is pressed into the bearing housing 34, it is warmed up upon contacting the warmer bearing and so a relatively large pressure is built up inside the housing. Such pressure usually affects the sealing lips 28 in a negative manner in that they are pressed harder against the shaft 38, causing them to be quickly worn out. However, the reinforcing portions 30 provided in the sealing device here decrease this negative effect by carrying a large amount of the pressure so that the sealing lips are less exposed to such pressure.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sealing device sealing off an opening between a shaft and a grease-lubricated split bearing housing comprised of an upper bearing housing half and a lower bearing housing half, the sealing device comprising:

a sealing element arranged in a circumferential groove in the opening of the bearing housing, the sealing element being divided into two seal halves by a diametrical cut, with each seal half comprising a main body *and each seal half being a one-piece seal half*;

the main body of each seal half being provided with a pair of sealing lips spaced apart from each other, with an intermediate grease reservoir between the sealing lips;

the main body of each seal half also comprising reinforcing portions arranged between the main body and the sealing lips to facilitate sealing engagement between the sealing lips and the shaft, with the reinforcing portions spaced from an outer surface of the shaft, when the upper bearing housing half provided with the upper seal half is mounted onto the shaft with the shaft resting in the lower bearing housing half provided with the lower seal half, the reinforcing portions projecting axially outside the sealing lips; and the main body of each seal half possessing shoulders on which bear a surface of the bearing housing adjacent the groove, the reinforcing portions being arranged at a distance from the shoulders so as to be spaced apart from the shoulders, *the sealing device contacting the shaft only at the pair of sealing lips*.

2. The sealing device according to claim 1, wherein the main body of each seal half also possesses a protrusion positioned between and extending away from the shoulders, the protrusion having a shape substantially corresponding to the groove of the bearing housing.

3. The bearing assembly according to claim 2, wherein the sealing lips have a smaller material thickness than the reinforcing portions.

4. The sealing device according to claim 1, wherein the reinforcing portions possess a material thickness greater than a material thickness of the sealing lips.

5. The sealing device according to claim 1, wherein the sealing device is made of a polymeric material.

6. The sealing device according to claim 1, wherein the sealing device is made of polyurethane.

7. The sealing device according to claim 1, wherein the sealing device is comprised of two one-piece halves.

8. A sealing device sealing off an opening between a shaft *possessing an outer surface* and a lubricated bearing housing comprised of a first bearing housing half and a second bearing housing half, the sealing device comprising:

an annular seal element divided into first and second one-piece seal halves by a diametrical cut, each of the first and second one-piece seal halves having a main body possessing one end at which is provided a protrusion positioned in a circumferential groove in one of the bearing housing halves, and an opposite end at which is provided a pair of sealing lips spaced apart from each other and engaging the shaft;

the first and second seal halves each having reinforcing portions arranged between the main body and the sealing lips;

each of the first and second halves possessing a pair of shoulders on which rests a surface of the bearing housing *adjacent the groove*, the reinforcing portions extending axially outside the shoulders; and the first and second seal halves each being provided with an intermediate lubricant reservoir located between the sealing lips, the reinforcing portions projecting axially outside the sealing lips, *and the reinforcing portions being spaced from the outer surface of the shaft, the sealing device contacting the shaft only at the pair of sealing lips*.

9. The sealing device according to claim 8, wherein each of the first and second seal halves possesses a protrusion and the pair of shoulders extending outwardly beyond an outer surface of the protrusion, a surface of the bearing housing resting on the shoulders.

10. The sealing device according to claim 9, wherein the protrusions possess a width adjacent a tip end of the protrusion that is less than the width of the protrusion adjacent the shoulders.

11. The bearing assembly according to claim 10, wherein the sealing lips have a smaller material thickness than the reinforcing portions.

12. The sealing device according to claim 8, wherein the reinforcing portions possess a material thickness greater than a material thickness of the sealing lips.

13. The sealing device according to claim 8, wherein the sealing device is made of a polymeric material.

14. The sealing device according to claim 8, wherein the sealing device is made of polyurethane.

15. A bearing assembly comprising:

a lubricated bearing housing having a circumferential groove formed on an inner surface of the bearing housing and comprised of a first bearing housing half and a second bearing housing half;

a shaft;

an opening between the shaft and the lubricated bearing housing;

a sealing device sealing off the opening between the shaft and the lubricated bearing housing, the sealing device comprising an annular seal element divided into two seal halves by a diametrical cut, and each seal half having a tapering protrusion positioned in the circumferential groove of the bearing housing;

*each seal half being a one-piece seal half;* each seal half comprising a main body provided with a pair of sealing lips spaced apart from each other and contacting the shaft, and reinforcing portions arranged between the main body and the sealing lips, the reinforcing portions projecting axially outside the sealing lips;

each seal half also possessing shoulders on which bear a surface of one of the first bearing housing half and the second bearing housing half *adjacent the groove*, the reinforcing portions being arranged at a distance from the shoulders so as to be spaced apart from the shoulders; and each sealing half also being provided with an intermediate grease reservoir located between the sealing lips, *the sealing device contacting the shaft only at the pair of sealing lips*.

16. The bearing assembly according to claim 15, wherein the protrusion on each seal half extends away from the shoulders.

17. The bearing assembly according to claim 16, wherein the sealing lips have a smaller material thickness than the reinforcing portions.

18. The bearing assembly according to claim 15, wherein the reinforcing portions possess a material thickness greater than a material thickness of the sealing lips.

19. The bearing assembly according to claim 15, wherein the sealing device is made of a polymeric material.

20. The bearing assembly according to claim 15, wherein the sealing device is made of polyurethane.

21. The bearing assembly according to claim 15, wherein the sealing device is comprised of two one-piece halves.

* * * * *